W. L. GILLIAM.
FILTERING MATERIAL.
APPLICATION FILED OCT. 16, 1911.
1,061,368.
Patented May 13, 1913.
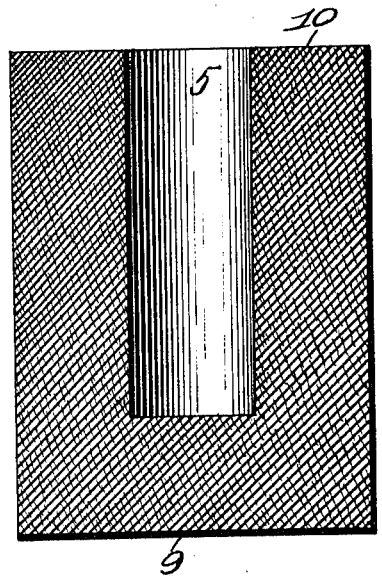
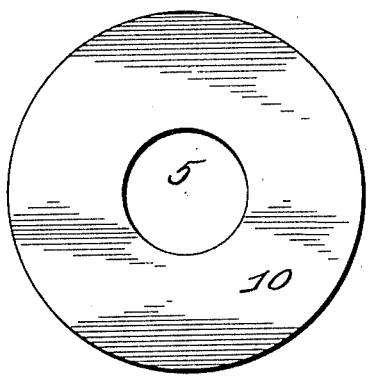
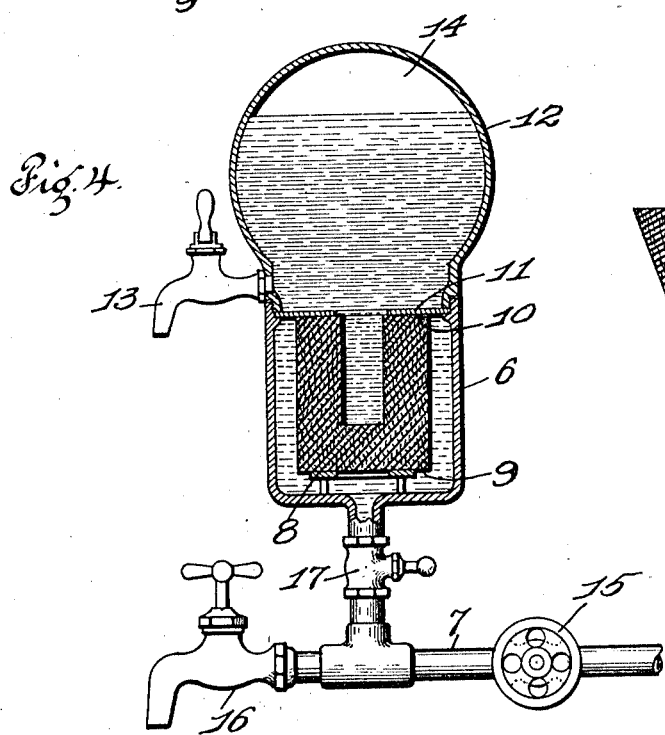
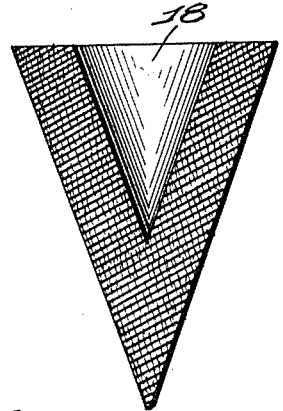
Witnesses
Walter C. Stein
M. G. Lindsey
Inventor
Walter L. Gilliam
By Alfred A. Hicks Atty.

UNITED STATES PATENT OFFICE.

WALTER L. GILLIAM, OF ST. LOUIS, MISSOURI.

FILTERING MATERIAL.

1,061,368.  Specification of Letters Patent.  Patented May 13, 1913.

Application filed October 16, 1911. Serial No. 655,073.

*To all whom it may concern:*

Be it known that I, WALTER L. GILLIAM, a citizen of the United States, and resident of St. Louis, Missouri, have invented certain new and useful Improvements in Filtering Material, of which the following is a specification.

This invention relates to improvements in a filtering material and has for its object a body formed in any suitable shape out of wood pulp, the same being subjected to an intense heat, and the body converted into a carbonized state.

A further object of my invention is to utilize wood pulp, compress the same into suitable shapes, the same placed into a vacuum container which is subjected to an intense heat; the pulp body being in this manner carbonized.

Figure 1 is a vertical sectional view of a body of the filtering material. Fig. 2 is a top plan view of the same. Fig. 3 is a vertical sectional view of a cone-shaped body formed out of the filtering material and is designed to be used as portable or pocket filter. Fig. 4 is a vertical sectional view of a filter casing showing a body of my improved material in a position so as to filter under hydrant pressure.

In carrying out my invention I construct a suitable body such as indicated in Fig. 1, the said body in this instance being provided with an aperture 5. The body when constructed in this form is designed to be used as a pressure filter and incased in a housing 6 attached to a water supply pipe 7. In order to retain the body in rigid position in the housing 6 I provide a suitable base 8 against which the bottom 9 of the body contacts and upon the upper edge 10 of the body is placed a gasket 11, said gasket having a central opening corresponding with the aperture 5 in the body. On the top of the housing 6 is mounted a dome 12, this dome being provided with a faucet 13 by which the filtered liquid is drawn off from the interior of the dome, the liquid when rising to a given height in the dome will cause the air therein to be compact in the space 14. The liquid under pressure passing through the body from the side and bottom enters into the aperture 5 and after said liquid has passed through the body and into the dome all particles of foreign substances and impurities are removed from the liquid.

The construction as shown in Fig. 4 is such that when it is desired to remove the foreign particles which might adhere to the outer surface of the body and without removing the body from the housing the valve 15 in the water main 7 is closed and the discharge cock 16 opened, the air pressure located in the upper portion of the dome will have a downward pressure upon the liquid causing said liquid to pass downwardly through the filtering material displacing the same and the foreign substances together with the liquid will pass out by way of the discharge cock 16. When it is desired to remove or replace the body in the housing the valve 17 located in the connection between the housing and the main 7 is closed so as to prevent the liquid from passing up into the housing during the operation of removing and replacing the body.

In Fig. 3 I show a conical form of filtering body; this can be used by placing the cone into a cup or other suitable container and the liquid poured into the cavity 18 permitting the same to percolate by its own gravity through the walls of the filtering material.

The essential feature of my invention is the forming of a body of filtering material out of wood pulp the said pulp being in a soft, moist condition when placed into the mold, when pressure is then applied so as to intermingle all of the pulp particles into one common mass, the shape, size or design being immaterial. After the body has been compressed to its desired form, the same is placed into a vacuum compartment or container and while in this container is subjected to an intense heat whereby the body is carbonized, thus, in other words the pulp formation by this method is converted into a body of charcoal.

I do not desire to limit myself to the use of my improved material for filtering purposes alone, as the same may be formed in various shapes and used for any purpose found applicable.

Having thus fully described my invention, what I claim is:

As an article of manufacture a filtering body composed of an intermingled fibrous wood pulp compressed into a solid mass, and said compressed body carbonized throughout making a solid compact non-separable filtering body, substantially as specified.

In testimony whereof, I have signed my name to this specification, in presence of two subscribing witnesses.

WALTER L. GILLIAM.

Witnesses:
ALFRED A. EICKS,
WALTER C. STEIN.